US007058011B1

(12) United States Patent

Stearns et al.

(10) Patent No.: US 7,058,011 B1

(45) Date of Patent: Jun. 6, 2006

(54) N TO ONE AND ONE TO ONE EQUIPMENT PROTECTION SWITCHING

(75) Inventors: Leo L. Stearns, Petaluma, CA (US); Matthew K. Meeker, Santa Rosa, CA (US)

(73) Assignee: Calix Networks, Inc., Petaluma, CA (US)

( * ) Notice: Subject to any disclaimer, the term of this patent is extended or adjusted under 35 U.S.C. 154(b) by 811 days.

(21) Appl. No.: 09/793,071

(22) Filed: Feb. 26, 2001

(51) Int. Cl.
*H04L 12/26* (2006.01)

(52) U.S. Cl. ........................ 370/219; 370/216; 370/220

(58) Field of Classification Search ........ 370/216–220, 370/225–228, 244–245
See application file for complete search history.

(56) References Cited

U.S. PATENT DOCUMENTS 5,229,990 A * 7/1993 Teraslinna .................. 370/218
5,321,393 A * 6/1994 Carlton et al. ......... 340/825.01
5,321,394 A * 6/1994 Carlton et al. ......... 340/825.01
5,596,569 A * 1/1997 Madonna et al. ........... 370/217
6,256,293 B1 * 7/2001 Gerstel et al. .............. 370/228
6,359,858 B1 * 3/2002 Smith et al. ................ 370/217
6,636,478 B1 * 10/2003 Sensel et al. ............... 370/216
6,879,559 B1 * 4/2005 Blackmon et al. .......... 370/225
6,906,997 B1 * 6/2005 Rajan et al. ................ 370/216

* cited by examiner

*Primary Examiner*—Dang Ton
*Assistant Examiner*—Michael J. Moore
(74) *Attorney, Agent, or Firm*—Silicon Valley Patent Group LLP

(57) ABSTRACT

A method and apparatus for effecting 1:1 or N:1 equipment protection switching in the line units of a voice-and-data access and transport network includes three sets of switches associated with the line units that can be selectively provisioned by the system operator into protect groups. In one embodiment, the switches are arranged and controlled within the protect groups by one or more dedicated microprocessors such that, upon the failure of a protected one of the line units in a protect group, the stream of traffic to an associated, protect one of the line units in the protect group is dropped, and the traffic stream to the failed line unit is switched over to the protect line unit for continued processing.

27 Claims, 16 Drawing Sheets

Key To

72
S6
S7
S8
S9
S10
30
40-6
50-6
10-6
39-6
(X)
40-7
50-7
10-7
39-7
07
40-8
50-8
10-8
39-8
08
40-9
50-9
10-9
39-9
09
40-10
50-10
10-10
39-10
010
60-6
60-6A
60-6B
60-6C
60-7
60-8
60-9
60-10
62

| | Line Unit Slot | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 10-1+1 Protect Groups | Prot | Main | Main | Prot | Prot | Main | Main | Prot | Prot | Main | Prot | Main | Prot | Main | Prot | Main | Prot | Main | Prot | Main |
| 4-4+1 Protect Groups | Prot | Main | Main | Main | Main | Prot | Main | Main | Main | Main | Main | Main | Main | Main | Prot | Main | Main | Main | Main | Prot |
| 2-9+1 Protect Groups | Prot | Main | Main | Main | Main | Main | Main | Main | Main | Main | Main | Main | Main | Main | Main | Main | Main | Main | Main | Prot |

FIG. 7A

N TO ONE AND ONE TO ONE EQUIPMENT PROTECTION SWITCHING

RELATED APPLICATIONS

This invention is generally related to broadband voice and data network access and transport systems, and in particular, to methods and apparatus for implementing external equipment protection switching in a hybrid, multifunctional access and transport system developed by the assignee hereof and referred to herein as the "C7 System."

BACKGROUND

Asynchronous transport mode ("ATM") is a communications standard that has been defined by certain domestic and international standards organizations for the transport of a broad range of user information, including voice, data, and video, over a user-to-network interface ("UNI"). ATM can be used to aggregate a wide variety of traffic types from a large number of widely dispersed individual users onto a single, high-speed UNI that effectively gives each user access to a "broadband" wide area network ("WAN"), or even a global area network ("GAN"), capable of high-speed voice and/or data transport at rates in accordance with a standardized capacity and quality of service ("QoS").

In the U.S., a synchronous digital hierarchy ("SDH") specification is referred to as the "synchronous optical network" ("SONET") specification, and currently contemplates effective transport rates of from 51.84 megabits per second (Mbps) ("OC-1"), to a maximum of 13.92 gigabits per second (Gbps) ("OC-255") using an optical fiber medium.

In such a system, users, such as telephone subscribers or data network users, access a high-speed, high-capacity internal, or "core," transport system through "line units" that interface with the internal transport system, which may be SONET-based, at a switch/multiplexer edge node, or "chassis," of the system transport core. The interface medium between the users and the line units in the chassis may be copper wire, cable, "fiber" (i.e., optical fiber), or some other physical medium, e.g., air. Regardless of the medium and the transport mechanism, however, it is desirable to provide some form of "survivability," or "protection" mechanism, for the traffic carried throughout the system, both "internally," i.e., within the transport system itself, and "externally," i.e. within the UNIs.

SUMMARY

A method and apparatus in accordance with this invention provides "one-to-one" ("1:1"), or alternatively, "N-to-one" ("N:1" or "N+1") equipment protection switching in a system having at least N+1 user-interface line units that receive, groom, and transmit data, video, and/or telephony traffic. In one embodiment, the line units are identical to one another, and are configured to provide 1:1 protection, wherein, for each line unit that carries protected traffic, another line unit is kept in a standby mode (i.e., kept idle or used to carry low priority, unprotected traffic) for use in case of failure. Switchover to a standby line unit requires an external alarm indication signal ("AIS") of the type normally generated when an equipment failure is detected.

In another embodiment, the line units are selectably provisionable to allow use in one of many possible configurations. In one such configuration, half of the line units are set up to operate in a standby mode for use in carrying traffic in case of failure of the remaining half of the line units, thereby providing 1:1 protection. In another of the many possible configurations, N line units carry traffic, and one line unit is provisioned to operate in the standby, protect mode, to effect N:1 protection.

In one embodiment, the apparatus has three sets each of first, second, and third switches. One each of the first and second switches are located in a respective one of the line units, and one each of the third switches may be located in or separately from the line units. Each first switch has an output port, and an input port that is switchable between two positions: a "main" position in connection with the traffic stream input to the line unit in which the switch is located, and a "protect" position in connection with the traffic input stream to another one of the line units.

Each of the second switches has an output port connected to the traffic input port of the traffic processing circuitry in the respective line unit in which the switch is located, and an input port that is switchable between a "main" position in connection with the output port of the first switch in the respective line unit, and a "protect" position disconnected from the output port of the first switch.

Depending on the embodiment, the third switches may be located in the respective line units, or on one or more "metal switch protection assemblies" ("MSPAs") that are separate from the line units. Each third switch is associated with a respective one of N "protected" line units. Each third switch has an output port connected to the "protect" input port of the first switch located in an associated, "protect" one of the line units, and an input port that is switchable between a "main" position disconnected from the input traffic stream to the associated protected line unit, and a "protect" position in connection with the input traffic stream to the associated protected line unit.

In one advantageous embodiment, the first and second switches are controlled by a programmable integrated circuit ("PIC") digital microprocessor located in each of two "Routing and Arbitration Processor" ("RAP") units located in the chassis, and the third switches, located on MSPAs remote from the line units, are controlled by a third microprocessor that is slaved to those in the RAP units and co-located with the switches on one of the MSPAs, designated as the "master MSPA." The switches are controlled such that, in the event of a failure of a protected one of the line units, the second and third switches associated with the failed line unit, and the first switch associated with the protect line unit are switched from their respective "main" positions to their respective "protect" positions, thereby causing the input traffic stream to the associated protect line unit traffic input port to be dropped by that unit, and the input traffic stream to the failed line unit to be disconnected from the failed line unit and switched over to the traffic stream input port of the associated protect line unit for continued processing thereby.

BRIEF DESCRIPTION OF THE DRAWINGS

FIG. 7A illustrates in chart form several possible protection configurations in a twenty-line-unit chassis with the protection switching apparatus of the present invention;

DETAILED DESCRIPTION

Figure 1A:
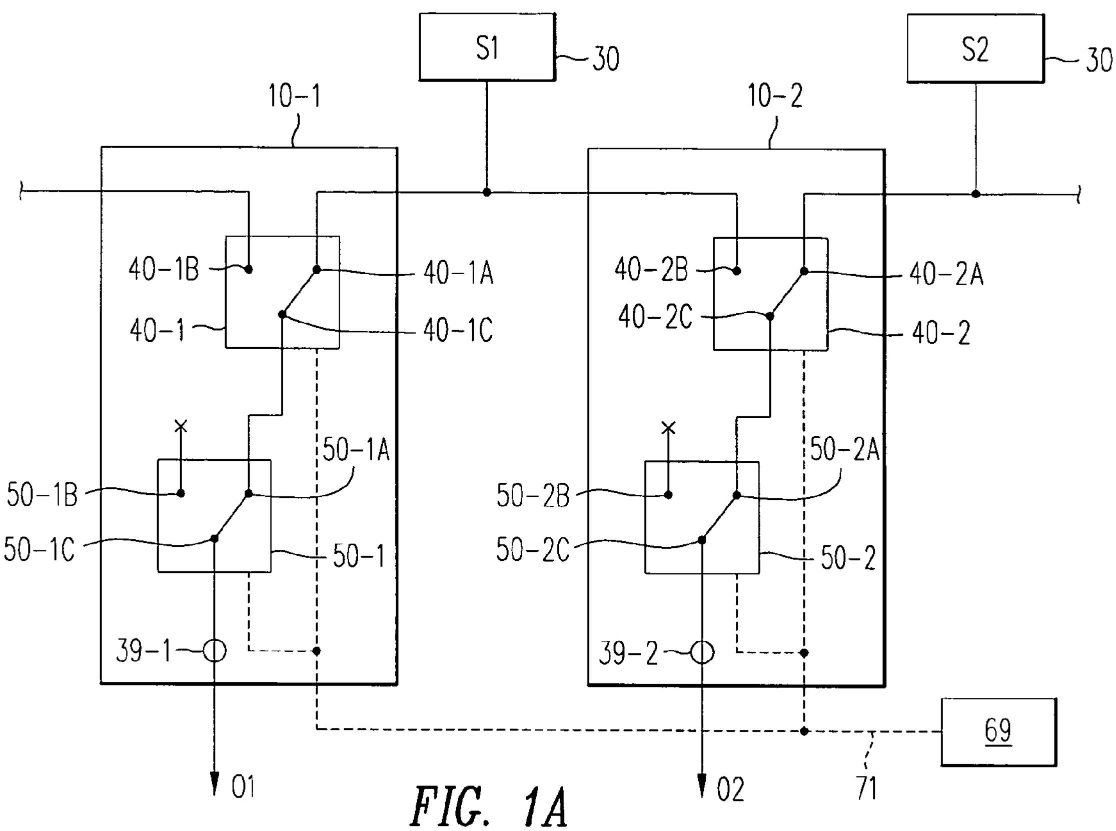
FIGS. 1A and 1B schematically illustrate two line units comprising a 1:1 protection group and incorporating equipment protection switching apparatus in accordance with a first exemplary embodiment of the present invention, shown before and after a protection switching event, respectively.
Figure 1B:
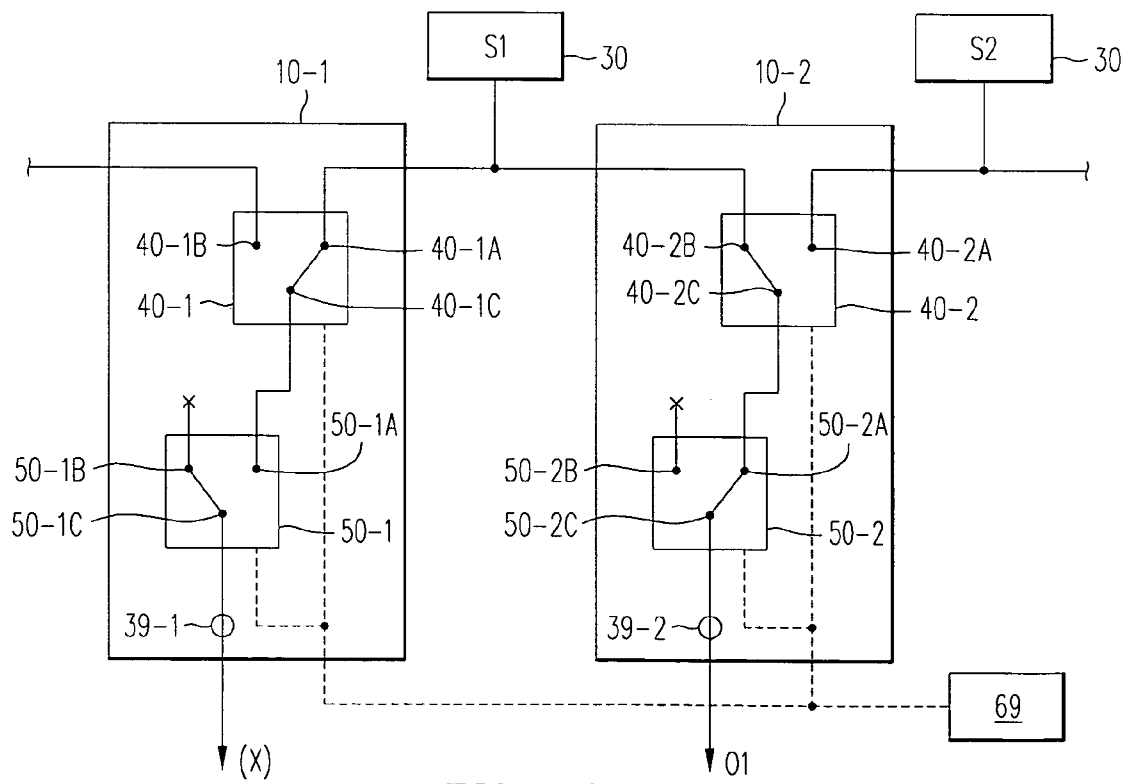

FIGS. 1A and 1B schematically illustrate two line units ("LUs") 10-1 and 10-2 incorporating one exemplary, 1:1 embodiment of the equipment protection switching apparatus of the invention. The LUs 10-1 and 10-2, which may be part of an assembly of several such line units LU-i, where 1≦i≦N+1, thus comprise a one-to-one "protection group" that has one "protected" LU 10-1, and one "protect" LU 10-2 that acts as a protector of the traffic on the protected line unit. Each of the two LUs 10-1 and 10-2 has a respective one of two user input traffic streams S1 and S2 input to it from, e.g., a telephone company ("Telco") connector 30.

Each of the traffic streams S1 and S2 is fed into a respective one of the traffic processing circuitries 39-1 and 39-2 located in each of the LUs 10-1 and 10-2, where the traffic is appropriately "groomed" or processed into, e.g., respective TDM or ATM output traffic streams O1 and O2.

It should be understood that, although the traffic streams S1/O1 and S2/O2 are shown as being unidirectional, or "simplex," in nature, i.e., flowing in the direction of the arrows seen in the figures, the flow of the traffic through the respective LUs 10-1 and 10-2 is actually simultaneous and bi-directional, or "duplex," i.e., traffic from remote points in the system also flows back from O1 and O2 through the LUs 10-1 and 10-2 to S1 and S2, in the direction opposite to that indicated by the arrows seen in FIGS. 1A and 1B.

The first exemplary 1:1 embodiment of the equipment protection switching apparatus of the invention illustrated in FIGS. 1A and 1B includes two sets of protection switches, a set of first protection switches 40-*i*, and a set of second protection switches 50-*i*.

Each of the first switches 40-*i* is associated with a respective one of the two LUs 10-1 and 10-2. A first one 40-1 of the first switches 40-*i* has an output port 40-1C, and an input port (not explicitly shown) that is switchable between a "main" position 40-1A in connection with the traffic stream S1 to the protected line unit 10-1, and a "protect" position 40-1B in connection with the traffic stream Si of another LU-i and disconnected ("X") from the traffic stream S1. The second one 40-2 of the first switches 40-*i* associated with the second LU 10-2 has an output port 40-2C, and an input port (not explicitly shown) that is switchable between a "main" position 40-2A in connection with the traffic stream S2, if any, to the protect LU 10-2, and a "protect" position in connection with the traffic stream S1 to the protected line unit 10-1.

A second switch 50-*i* is also associated with respective ones of the LUs 10-1 and 10-2. A first one 50-1 of the second switches 50-*i* has an output port 50-1C connected to the traffic processing circuitry 39-1 of the protected LU 10-1, and an input port (not shown explicitly) that is switchable between a "main" position 50-1A in connection with the output port 40-1C of the first switch 40-1 associated with the protected LU 10-1, and a "protect" position 50-1B disconnected ("X") from the output port 40-1C of the associated first switch 40-1.

A second one of the second switches 50-2 has an output port 50-2C connected to the traffic processing circuitry 39-2 of the protect LU 10-2, and an input port that is switchable between a "main" position 50-2A in connection with the output port 40-2C of the first switch 40-2 associated with the protect LU 10-2, and a "protect" position 50-2B disconnected ("X") from the output port 40-2C of the associated first switch 40-2.

Figure 2A:
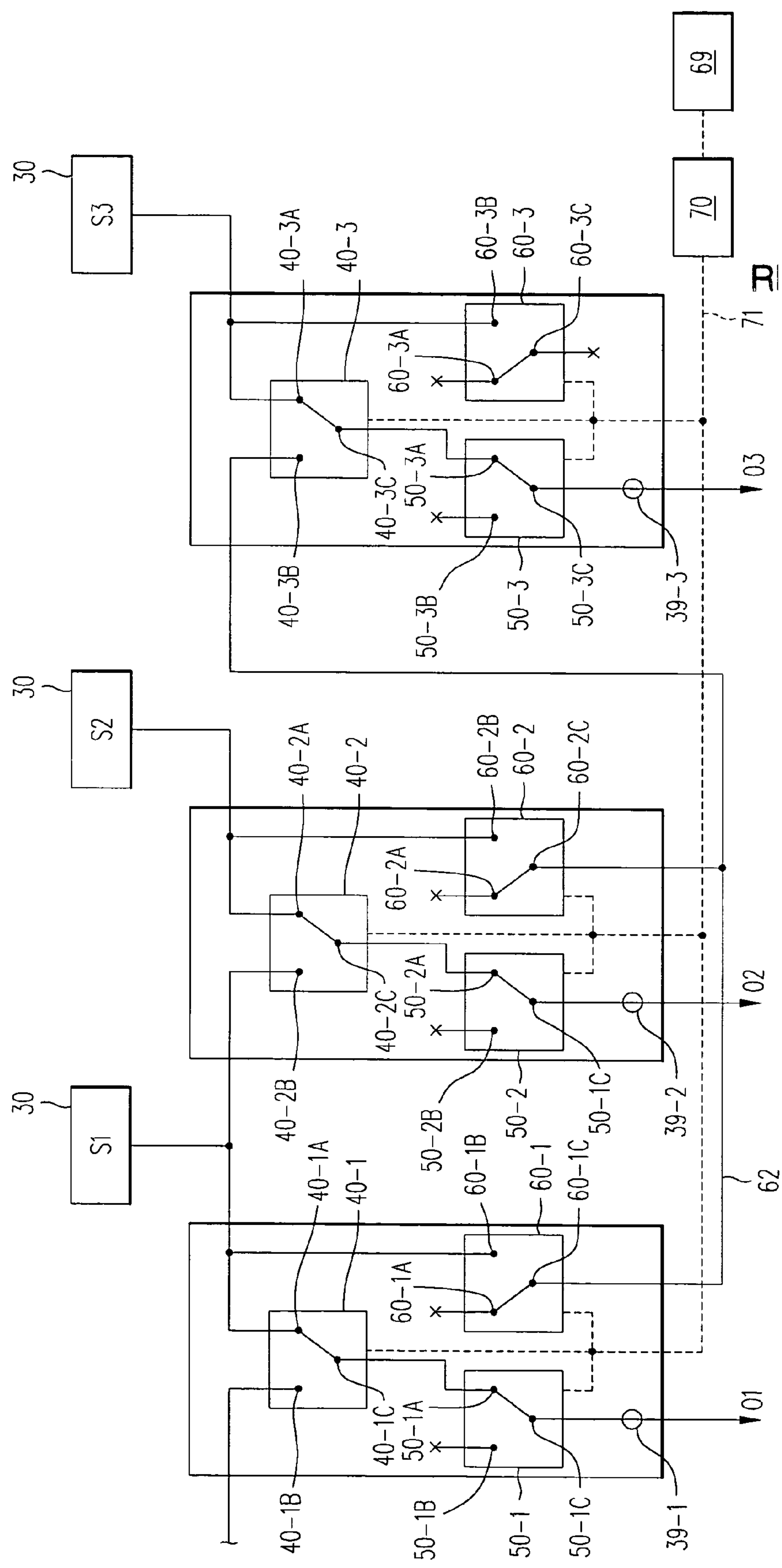
FIGS. 2A and 2B schematically illustrate three line units comprising an N:1 protection group and incorporating equipment protection switching apparatus in accordance with a second exemplary embodiment of the present invention, shown before and after a protection switching event, respectively.
Figure 2B:
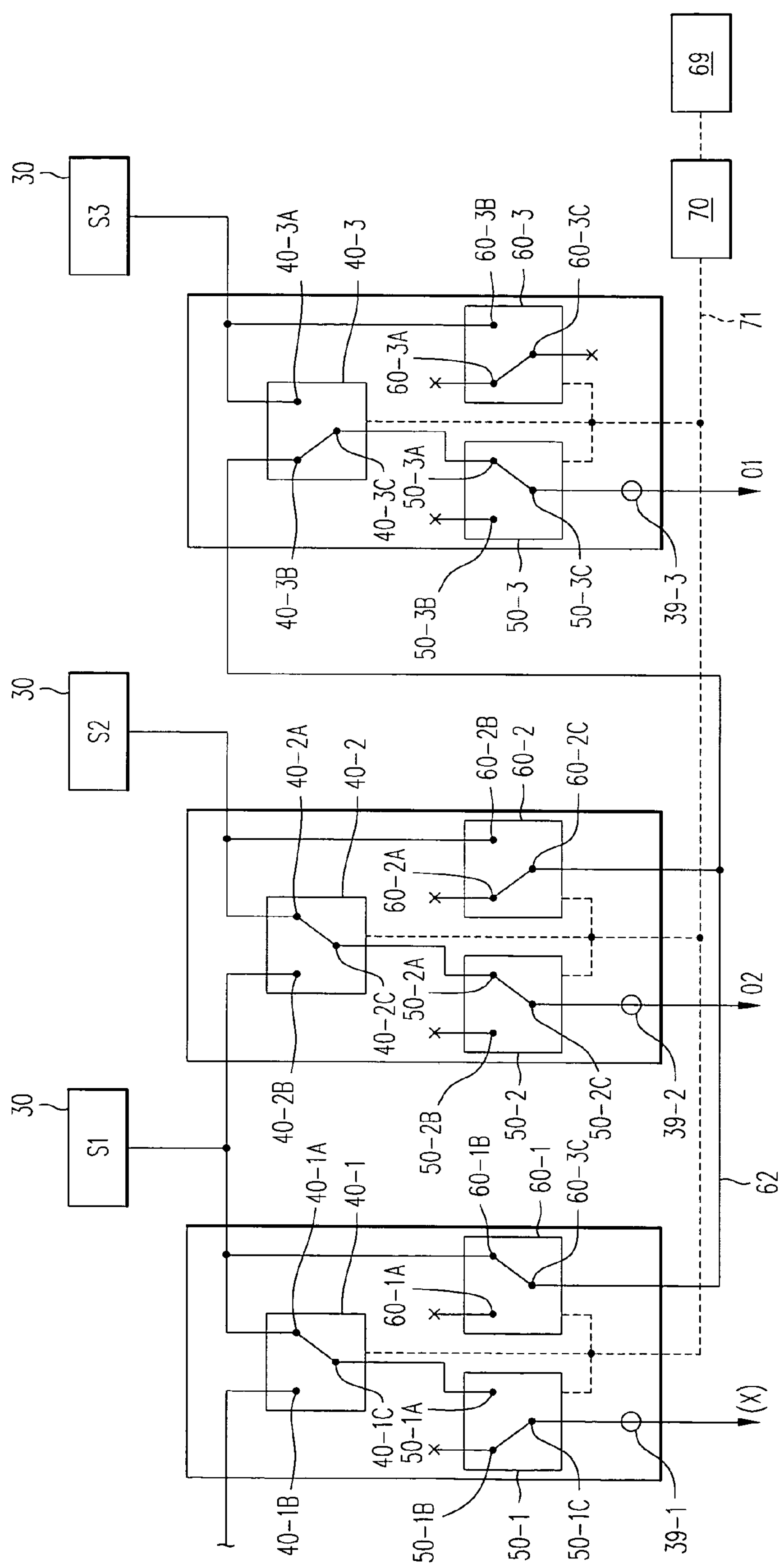

Upon the occurrence of a "protection event," i.e., a failure in the protected LU 10-1, the second protection switch 50-1 in the protected LU 10-1 is switched from its "main" input position 50-1A (as illustrated in FIG. 1A) to its "protect" position 50-1B (as illustrated in FIG. 2B). Also, the first protection switch 40-2 in the protect LU 10-2 is switched from its "main" input position 40-2A (as illustrated in FIG. 1A), to its "protect" position 40-2B (as illustrated in FIG. 1B). This causes the traffic stream S2 to the protect LU 10-2 to be dropped, and the traffic stream S1 to the protected LU 10-1 to be disconnected from the traffic processing circuitry 39-1 of LU 10-1 and switched over to the traffic processing circuitry 39-2 of the protect LU 10-2, which then processes the traffic S1 into the traffic output stream O1 of the failed, protected LU 10-1. Thus, 1:1 equipment protection switching is effected in the exemplary first embodiment.

It should be noted that the selective operation of the protection switches as described above is triggered by an external signal generated by a microprocessor in response to the detection of a failure in the operation of the traffic processing circuitry 39-*i* of a protected LU 10-*i* in a manner described in more detail below.

It may be further noted from the above description that a first one of the first switches 40-1 in the protected LU 10-1 and a second one 50-2 of the second switches in the protect LU 10-2 are not involved in the protection switching activity, and are therefore redundant. However, where the first and second protection switches 40-*i* and 50-*i* are both located within the LUs 10-1 and 10-2, it may be desirable in some implementations to include both redundant switches in respective ones of the protected LU 10-1 and protect LU 10-2 so that the two LUs are configured identically, as illustrated, and are therefore interchangeable with one another. Such interchangeable line units save both manufacturing costs, because only one type of LU need be manufactured, and maintenance costs, because only one type of LU need be kept in inventory.

A second exemplary embodiment of an equipment protection switching apparatus in accordance with the present invention that can be selectively provisioned in either a 1:1 or an N:1 protection configuration is illustrated in FIGS. 2A and 2B. The second embodiment is somewhat similar to the first embodiment described above in that it includes a set each of first and second protection switches 40-*i* and 50-*i*, respectively, that are configured similarly to those in the first embodiment described above, except that the "protect" input port 40-3B of the first protection switch in the protect LU 10-3 is selectively connectable to any one of several protected LUs 10-*i* via a "bypass bus" 62, as described below. In the second exemplary embodiment, the protection group includes two protected LUs 10-1 and 10-2 and the one protect LU 10-3.

The second embodiment illustrated in FIGS. 2A and 2B further differs from the first embodiment in that it also includes a set of third protection switches 60-*i*, each associated with a respective one of the LUs 10-1, 10-2, and 10-3. A first one 60-1 and a second one 60-2 of the third switches 60-*i* each has a respective output port 60-1C and 60-2C connected, via the bypass bus 62 above, to the "protect" input port 40-3B of the first switch 40-3 associated with the protect LU 10-3. The third switches 60-1 and 60-2 also have a respective input port (not shown explicitly) that is switchable between a "main" position 60-1A and 60-2A, respectively, that is disconnected ("X") from a respective one of the traffic streams S1 and S2, and a "protect" position in connection with a respective one of the streams.

In the second embodiment illustrated in FIGS. 2A and 2B, a third one 60-3 of the third switches 60-*i* is associated with the protect LU 10-3, and is configured similarly to the foregoing first and second ones 60-1 and 60-2 of the third switches 60-*i*, except that its output 60-3C is disconnected ("X") from the bypass bus 62.

In a protection event involving the second embodiment, the protect LU 10-3 can protect either one of the protected LUs 10-1 and 10-2. In the example illustrated in FIG. 2B, the protected LU 10-1 has failed. Responsively, the second and third protection switches 50-1 and 60-1 in the failed LU 10-1, and the first protection switch 40-3 in the protect LU 10-3, are switched, by an external signal as described above, from their respective "main" positions 50-1A, 60-1A, and 40-3A, as illustrated in FIG. 2A, to their respective "protect" positions 50-1B, 60-1B and 40-3B, as illustrated in FIG. 2B. This switching causes the traffic stream S3 to the protect LU 10-3 to be dropped, and the traffic stream S1 to the failed LU 10-1 to be disconnected from the traffic processing circuitry 39-1 of LU 10-1 and switched, via the bypass bus 62, over to the traffic processing circuitry 39-3 of the protect LU-3, which then processes the traffic stream S1 into the output traffic stream O1 of the failed LU 10-1, as in the case of the first embodiment described above.

It may be noted that a similar result would have obtained if LU 10-2 had failed instead of LU 10-1. Thus, it may be seen that the third embodiment effects N:1 equipment protection switching, where N=2, and further, that N can take any integer value of 1 or greater. That is, with the method and apparatus of the second embodiment of the invention, any group of N+1 LUs 10-*i* can be selectively provisioned into at least one protection group in which N protected LUs 10-*i* are protected by one protect LU 10-*j*. Other N:1 protection groups are also possible, as discussed below.

Figure 9:
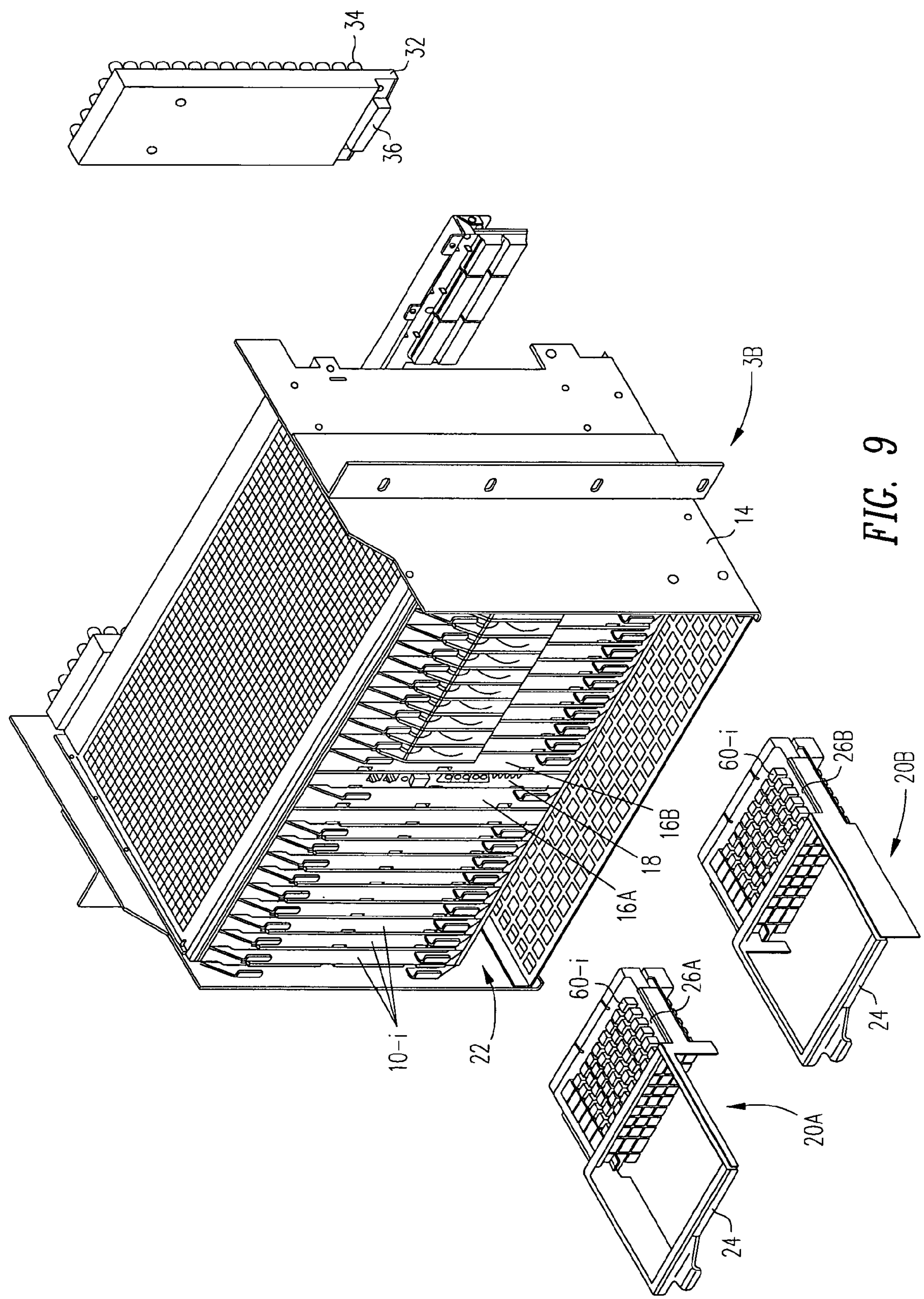
FIG. 9 illustrates a front side perspective view of a chassis assembly, or "shelf," of the system shown in FIG. 8; and, FIG. 10 illustrates in perspective a rear side view of the chassis assembly shown in FIG. 8.

In one possible embodiment of the invention, actuation of the affected protection switches 40-*i*, 50-*i* and 60-*i* by the above-described AIS signal may be effected by a dedicated microprocessor 69 (see FIGS. 1A and 2A) provided in each of the "Routing and Arbitration Processor" ("RAP") units 16A, 16B (see FIG. 9) located in the chassis in which the LUs 10-1 and 10-2 are housed. Alternatively, where the third switches 60-*i* are advantageously located in separate "metal switch protection assemblies" ("MSPAs") 26A, 26B (see FIG. 9), one of the MSPAs, designated as the "master MSPA," may include a second, dedicated microprocessor 70 (see FIGS. 1 and 2) that is slaved to the first microprocessors 69 located in the RAP 16A and 16B units, and which is pre-programmed with the particular N:1 equipment protection switching implemented by the operator. The RAP units 16A, 16B are continuously aware of the operational status of each of the LU's 10-*i*, and in response to the detection of a failure in a protected LU 10-*i*, the microcontrollers 69, 70 generate the external signal, e.g., a 16-bit digital "word," that is respectively addressed to the affected protection switches 40-*i*, 50-*i*, and 60-*i*, as described above. This external signal is then transmitted to the respective affected switches on, e.g., a serial bus 71 (shown by dashed line in FIGS. 1 and 2), to actuate them appropriately. In such an embodiment, failure detection and protection switching can be accomplished in less than 2 milliseconds ("ms").

Programming of the microprocessors 69 and 70 to generate the external signal as described herein will be apparent to a skilled programmer in view of the disclosures herein. With reference to the logic diagram of FIG. 7B, the operation of the microprocessors 69 and 70 in one exemplary embodiment is as follows. The microprocessors 69 and 70 are pre-programmed, e.g., in an erasable, programmable-read-only-memory ("EPROM") component, with the particular protection scheme currently provisioned for the associated chassis, i.e., a 1:1 protection scheme or an N:1 protection scheme, together with data corresponding to the protection assignments of the respective corresponding protected and protect LUs 10-*i* and 10-*j*. The microprocessors 69, 70, upon reading 80 the protection configuration memory, are thereafter continuously aware of the specific protection scheme currently in effect for the chassis.

Figure 7B:
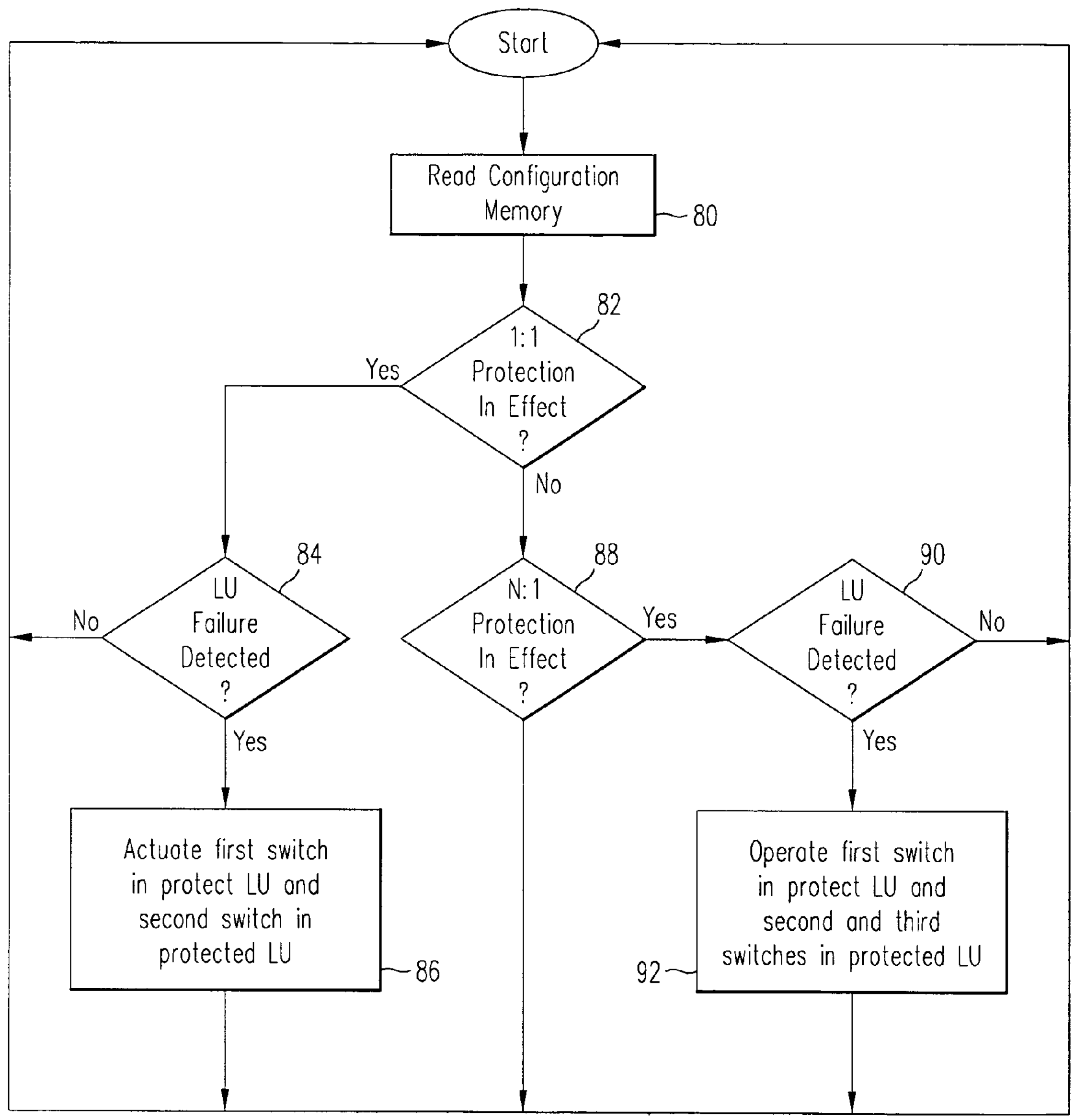
FIG. 7B illustrates in a flow chart the logical operation of one embodiment of protection switching in accordance with the invention.

As illustrated in FIG. 7B, if a 1:1 protection scheme 82 is in effect, the detection of a failure 84 in one of the protected LUs 10-*i* by the RAP units 16A and 16B triggers operation 86 of the microprocessors 69 and 70 to generate and transmit an appropriate actuation signal along the switch control bus 71 to the appropriate respective first switch 40-*j* of the protect LU 10-*j* and the second switch 50-*i* of the protected LU 10-*i* to effect 1:1 protection switching in accordance with that described above in connection with FIGS. 1A and 1B. If an N:1 protection scheme 88 is effective, the detection of a failure 90 in one of the protected LUs 10-*i* triggers operation 92 of the microprocessors 69, 70 to generate and transmit an appropriate actuation signal on the switch control bus 71 to the appropriate first, second, and third switches 40-*j* and 50-*i*, 60-*i* of the protected and protect LUs 10-*i* and 10-*j*, respectively, to effect N:1 protection switching in accordance with that described above in connection with FIGS. 2A and 2B.

It may be noted from the above discussion that the first switch 40-1 of the failed, protected LU 10-1, and both the second and third switches 50-3 and 60-3 associated with the protect LU 10-3 are not involved in the N:1 protection switching event. However, as in the first embodiment described above, where the protection switches are actually located in the respective LUs, it may be desirable to include the two switches 50-3 and 60-3 in the protect LU-3 so that the LUs 10-1, 10-2, and 10-3 are all configured identically, as illustrated in FIGS. 2A and 2B, and hence, interchangeable with one another, for the reasons described above.

The first, second, and third protection switches 40-*i*, 50-*i*, and 60-*i* of the first and second exemplary embodiments discussed above may each comprise a simple, single-pole, double-throw ("SPDT") switch that can implemented in an electromagnetic relay device of a known type. Preferably, to minimize power dissipation, the relays may be of a type that is "normally closed" ("NC") in the "main," i.e., protect position, and which can be actuated once, e.g. with a single voltage pulse, to switch the device to the "protect" position, and thereafter, actuated again, e.g., with a reverse voltage pulse, to reset it to the normal, "main" position.

Alternatively, the protection switches 40-*i*, 50-*i*, and 60-*i* may be provided in a "solid state" type of switching device, e.g., pairs of transistors switched by bi-stable multi-vibrators. Again, to minimize power dissipation, it may be advantageous if such "solid state" switches are implemented in complementary metal oxide semiconductor ("CMOS") designs.

Regardless of the type of protection switches 40-*i*, 50-*i*, and 60-*i* incorporated in the protection switching method and apparatus, however, it should be understood that each of the switches must simultaneously switch up to M lines (e.g., 24 lines) when actuated, depending on the number of individual voice or data lines used to carry the traffic streams Si and Oi going into and coming out of a LU 10-*i*. This requires an input/output connector on each LU 10-*i* of 2M pins. Locating the first and second protection switches 40-*i* and 50-*i* in the LUs 10-*i* increases this requirement by an additional M pins, and locating the third protection switches 60-*i* onboard the LUs 10-*i* increases the total pin requirement of each LU 10-*i* by another M pins, i.e., to 4M pins. Further, as discussed above, locating the third protection switches 60-*i* onboard the LUs 10-*i* necessitates the provision of a redundant third switch 60-*i* on each of the LUs provisioned as an protect LU 10-*j*, for interchangeability reasons. Thus, to achieve an economy in both LU connector pins and switches, it may desirable in some N:1 equipment protection switching embodiments to locate the third switches 60-*i* separately from the LUs 10-*i*, as described below.

Figure 3A:
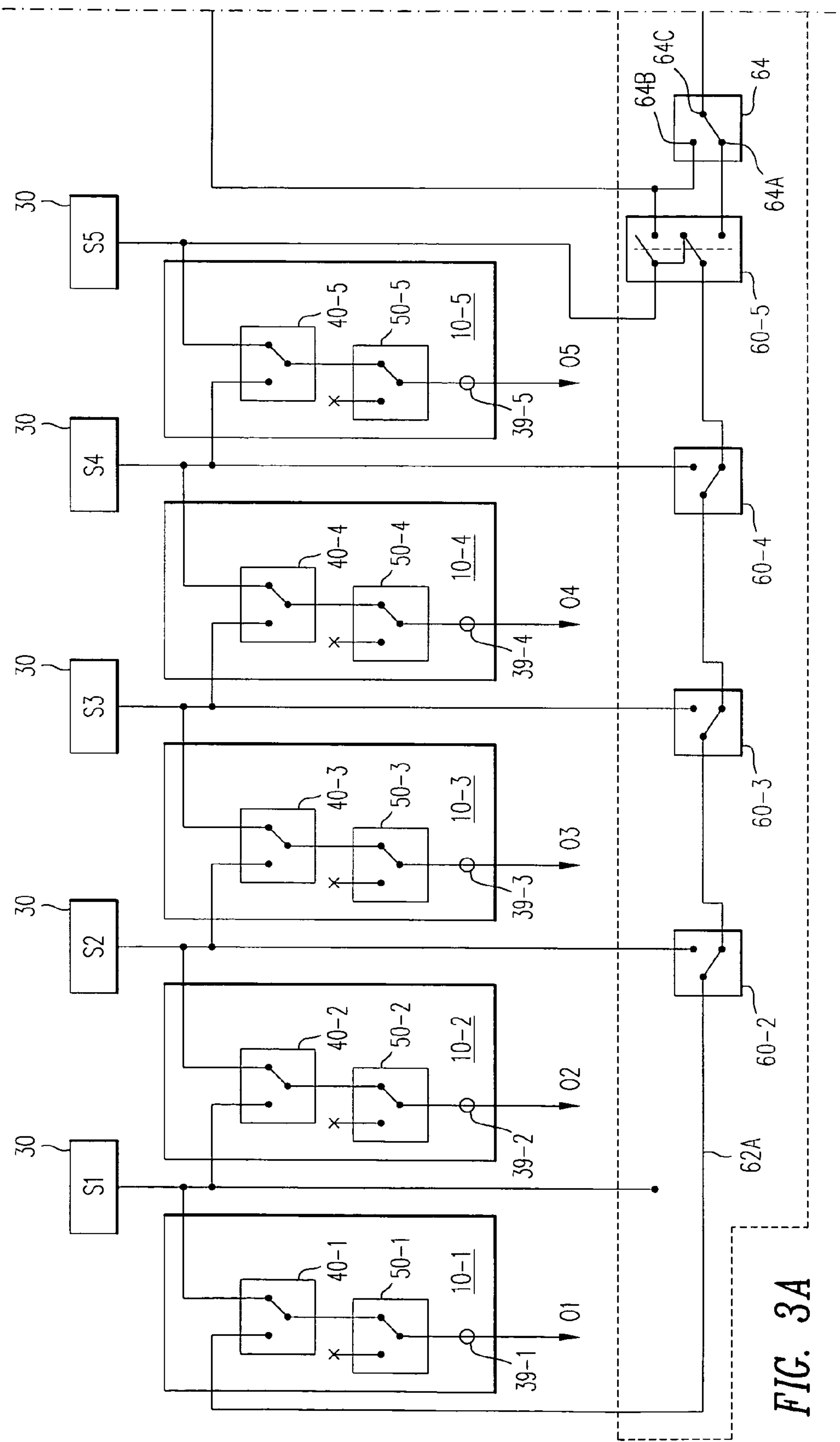
FIG. 3 schematically illustrates ten line units incorporating equipment protection switching apparatus in accordance with the present invention before being provisioned into protection groups.
Figure 3B:
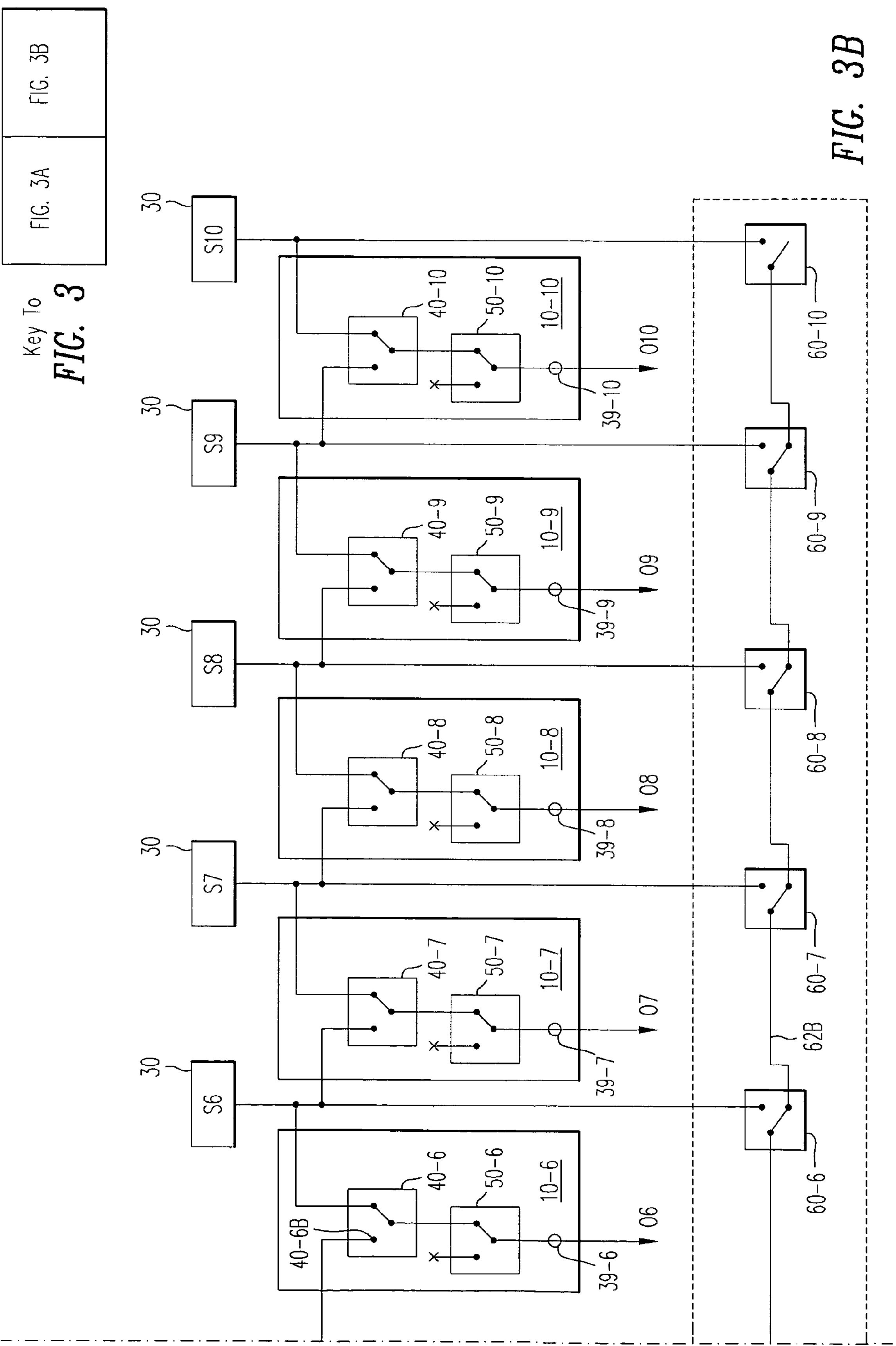

FIG. 3 shows ten LUs, 10-1 . . . 10-*i* . . . 10-10, which represent half of a full complement of twenty LUs 10-*i* that can be incorporated in one exemplary chassis assembly described below, with no protection switching in effect. In this embodiment, the third protection switches 60-*i* are located separately from the LUs 10-*i*, and further, two of the third protection switches 60-5 and 64 are implemented and/or arranged differently than the other third switches 60-*i*, for reasons discussed below.

Figure 5A:
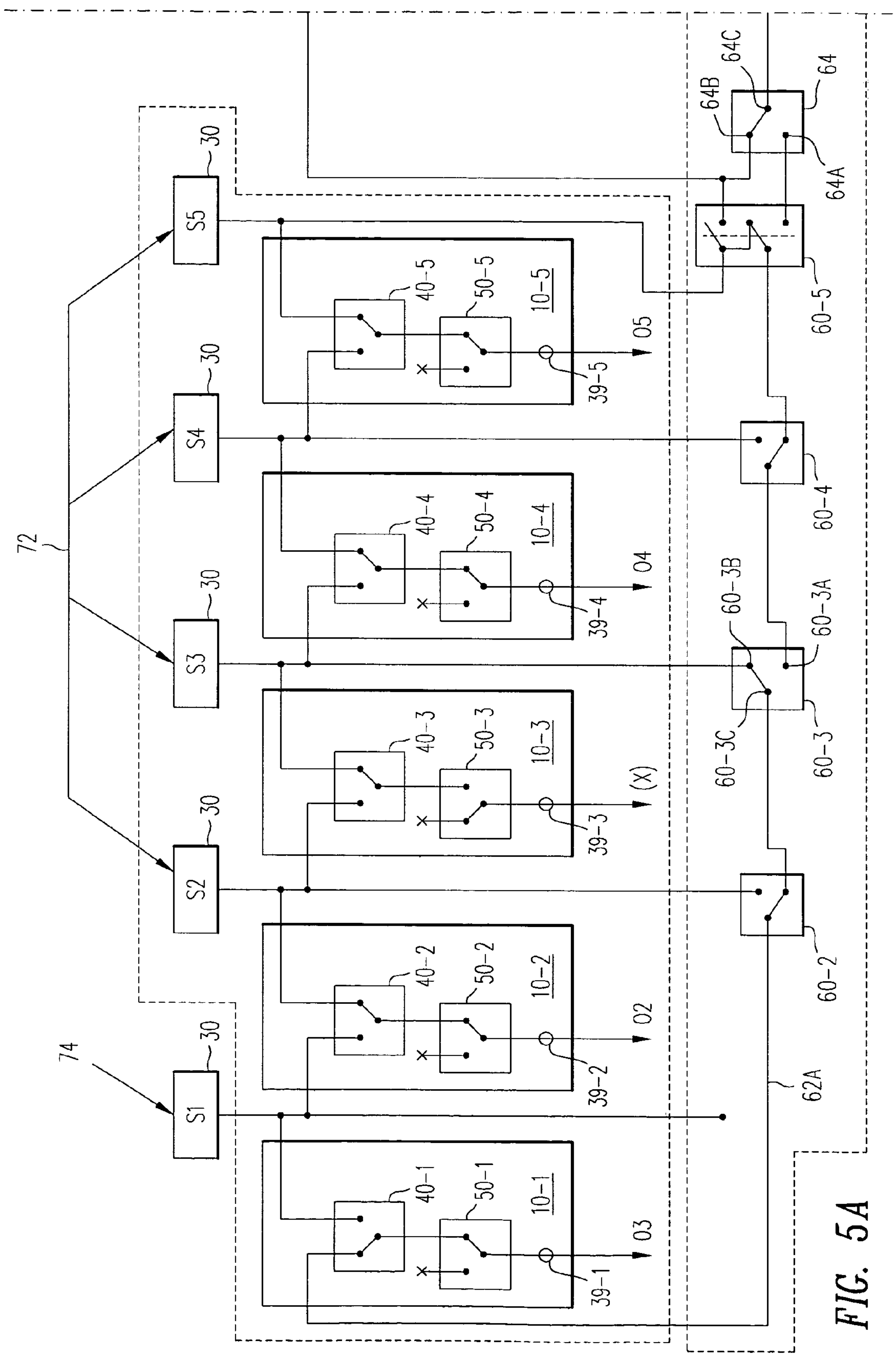
FIG. 5 illustrates the ten line units shown in FIG. 3 after being provisioned into two, "4:1" protection groups, with protection switching active on one failed line unit in each of the two groups.
Figure 5B:
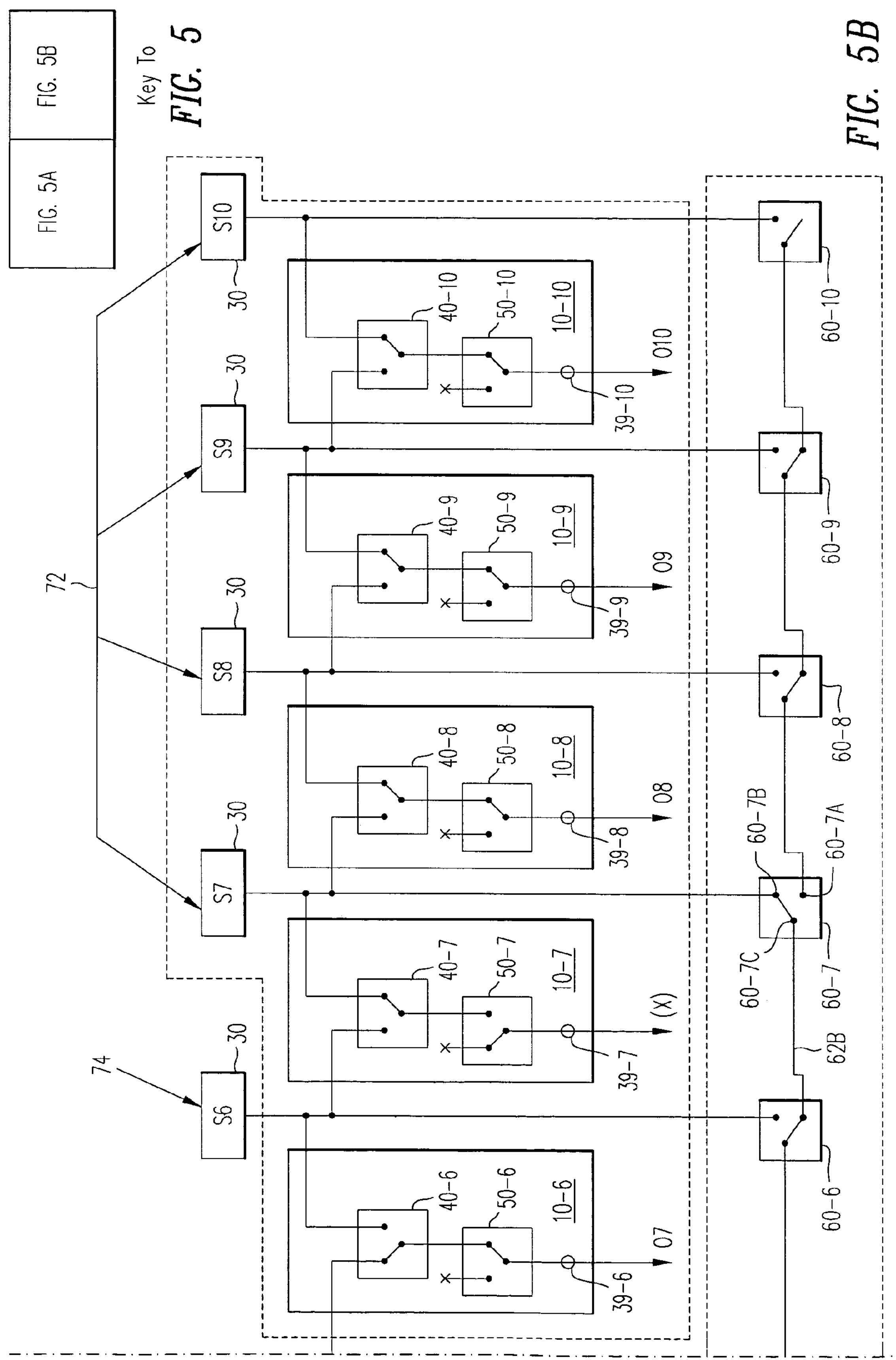
Figure 6A:
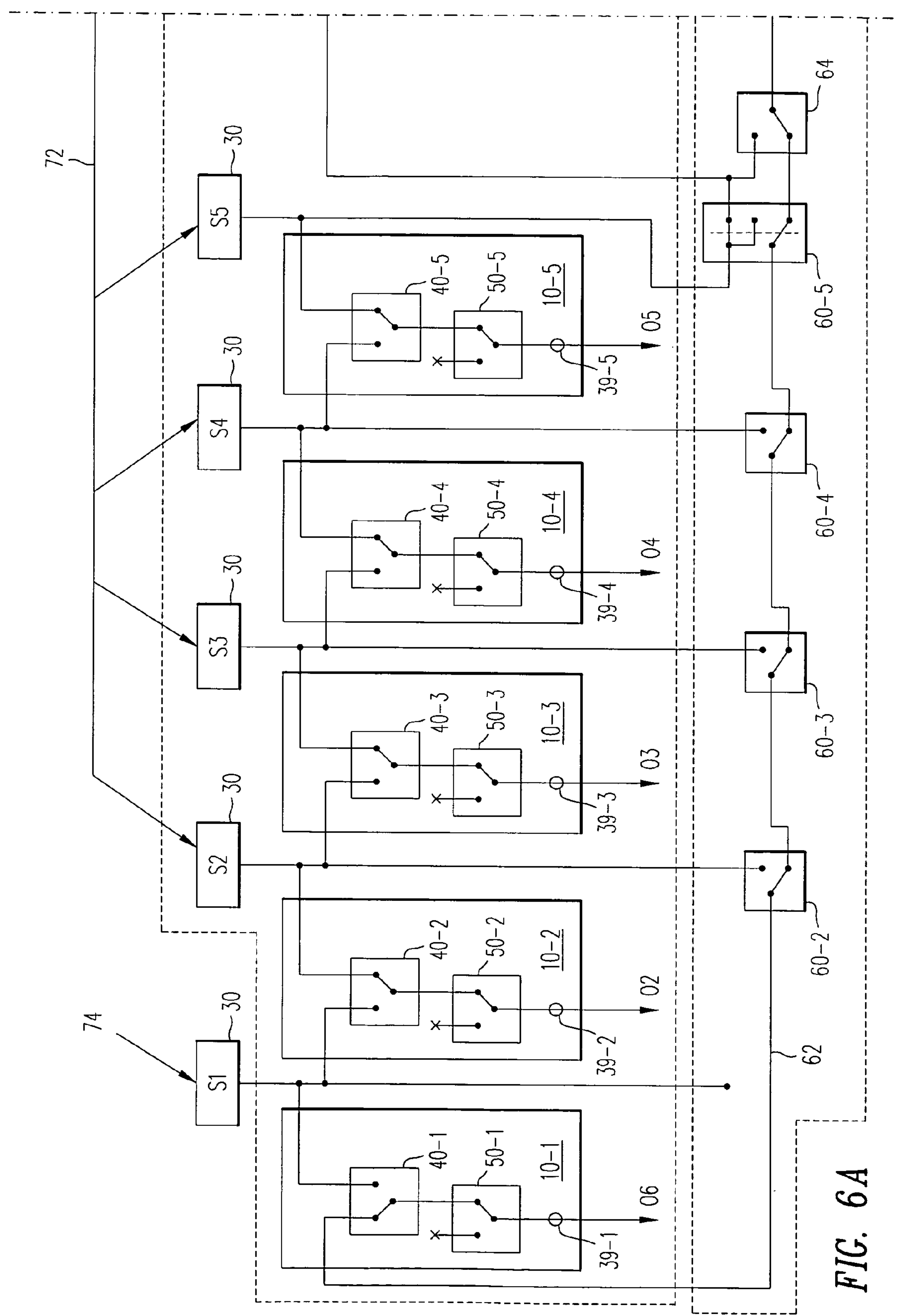
FIG. 6 illustrates the ten line units shown in FIG. 3 after being provisioned into one, "9:1" protection group, with protection switching active on one failed line unit in the group.
Figures 6, 6A, 6B:
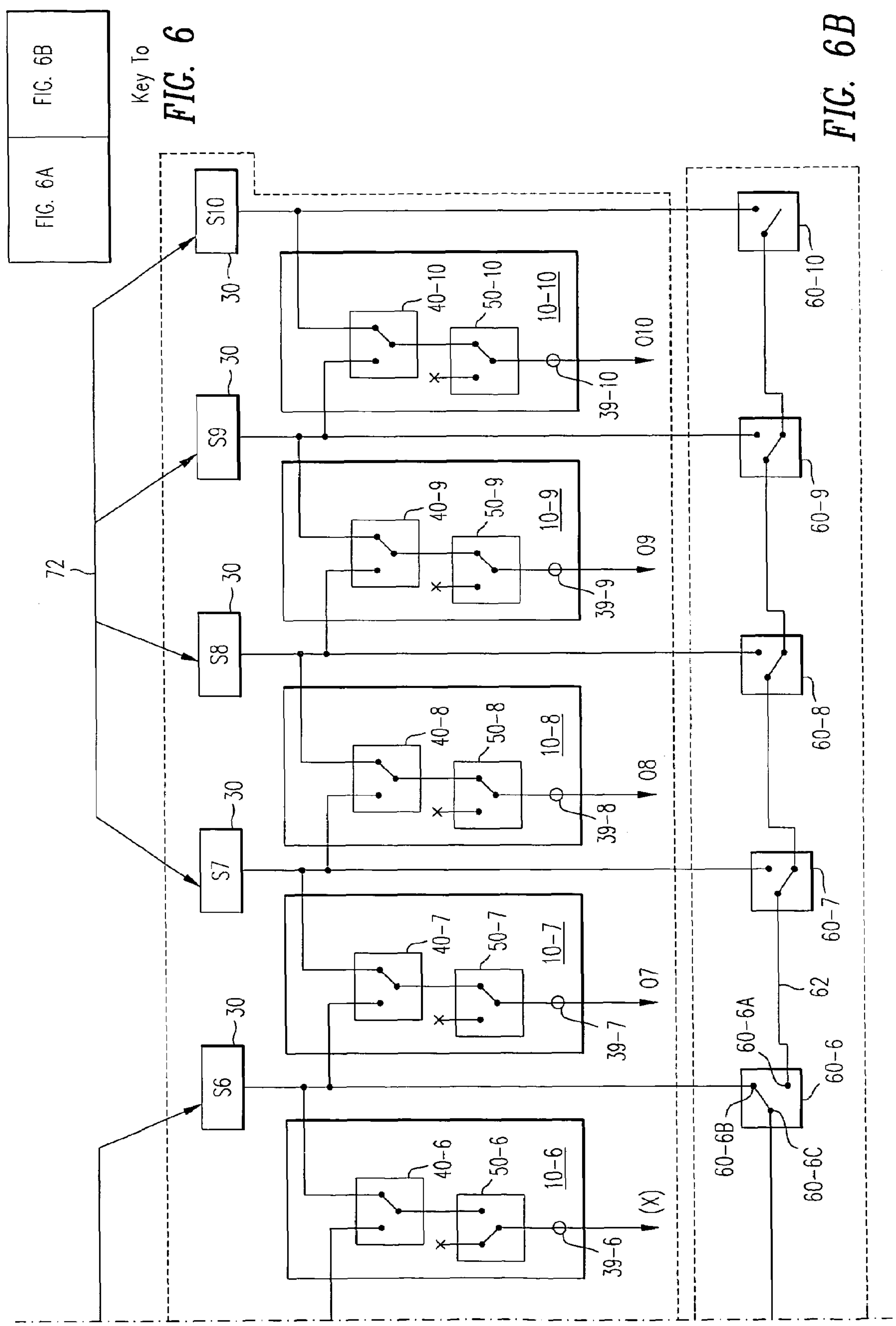

In particular, switch 60-5 is a "dual" switch that is switchable between a "main" position (illustrated in FIGS. 3–5) and a "protect" position (illustrated in FIG. 6). In the "main" position of switch 60-5, the LU 10-5 input traffic stream S5 is connected to a left-hand part 62A of a bypass bus associated with LUs 10-1 through 10-5 (assuming third switches 60-2–60-4 remain in the "main" position as illustrated in FIG. 3). In the "protect" position of third switch 60-5, traffic stream S5 is disconnected from the left-hand part 62A of the bypass bus, and instead, a right-hand bypass bus part 62B is connected to the left-hand bypass bus part 62A (assuming third switches 64 and 60-6 remain in the "main" position as illustrated in FIG. 3).

The third switch 64 has an input port 64C connected to the right-hand bypass bus part 62B, and an output port (not explicitly shown) that is switchable between a "main" position 64A in connection with the left-hand bypass bus part 62A, and a "protect" position 64B in connection with the "protect" input port 40-6B of the first protection switch 40-6 in LU 10-6.

Figure 4A:
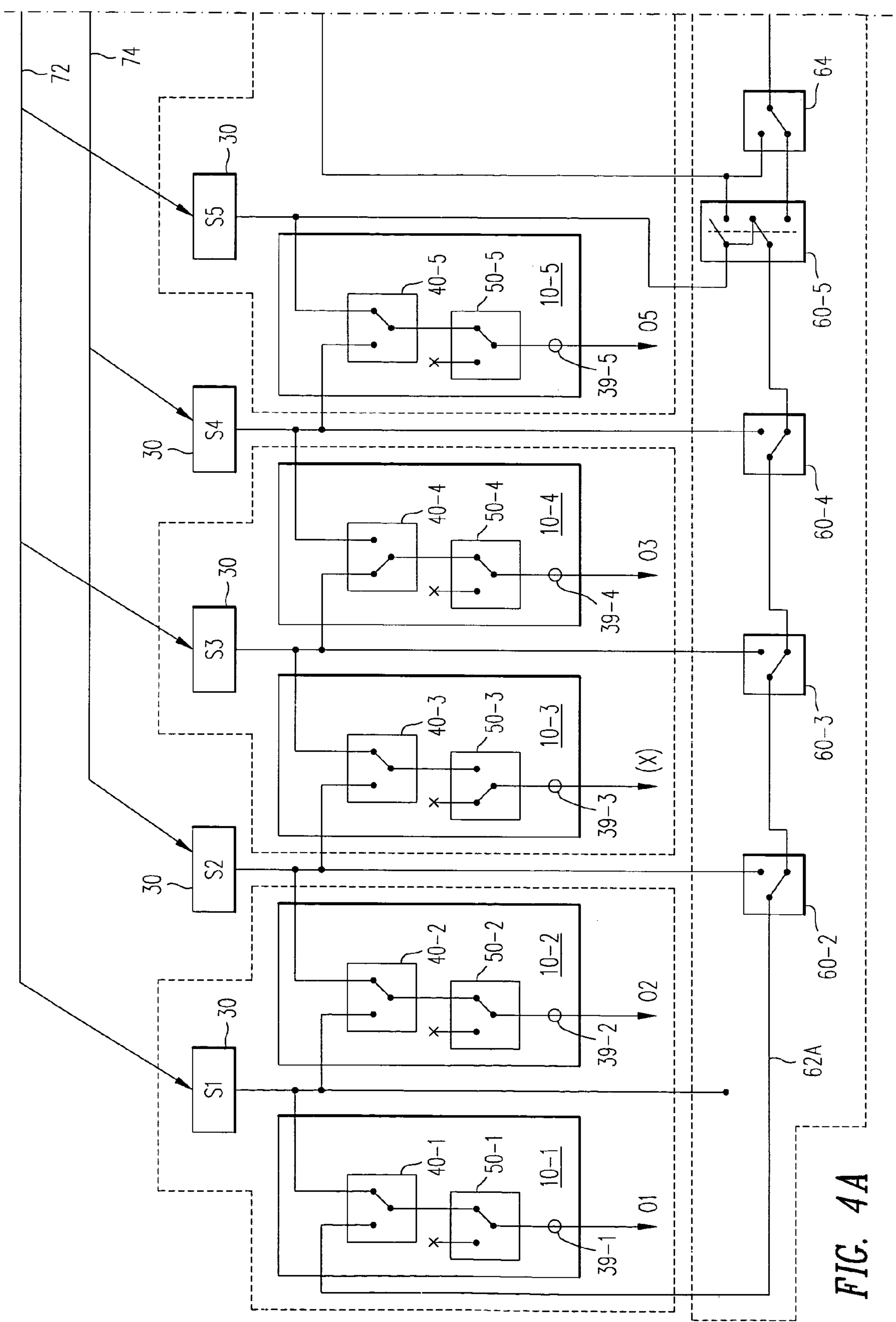
FIG. 4 illustrates the ten line units shown in FIG. 3 after being provisioned into five, "1:1" protection groups, with protection switching active on one failed line unit in one of the five groups.
Figure 4B:
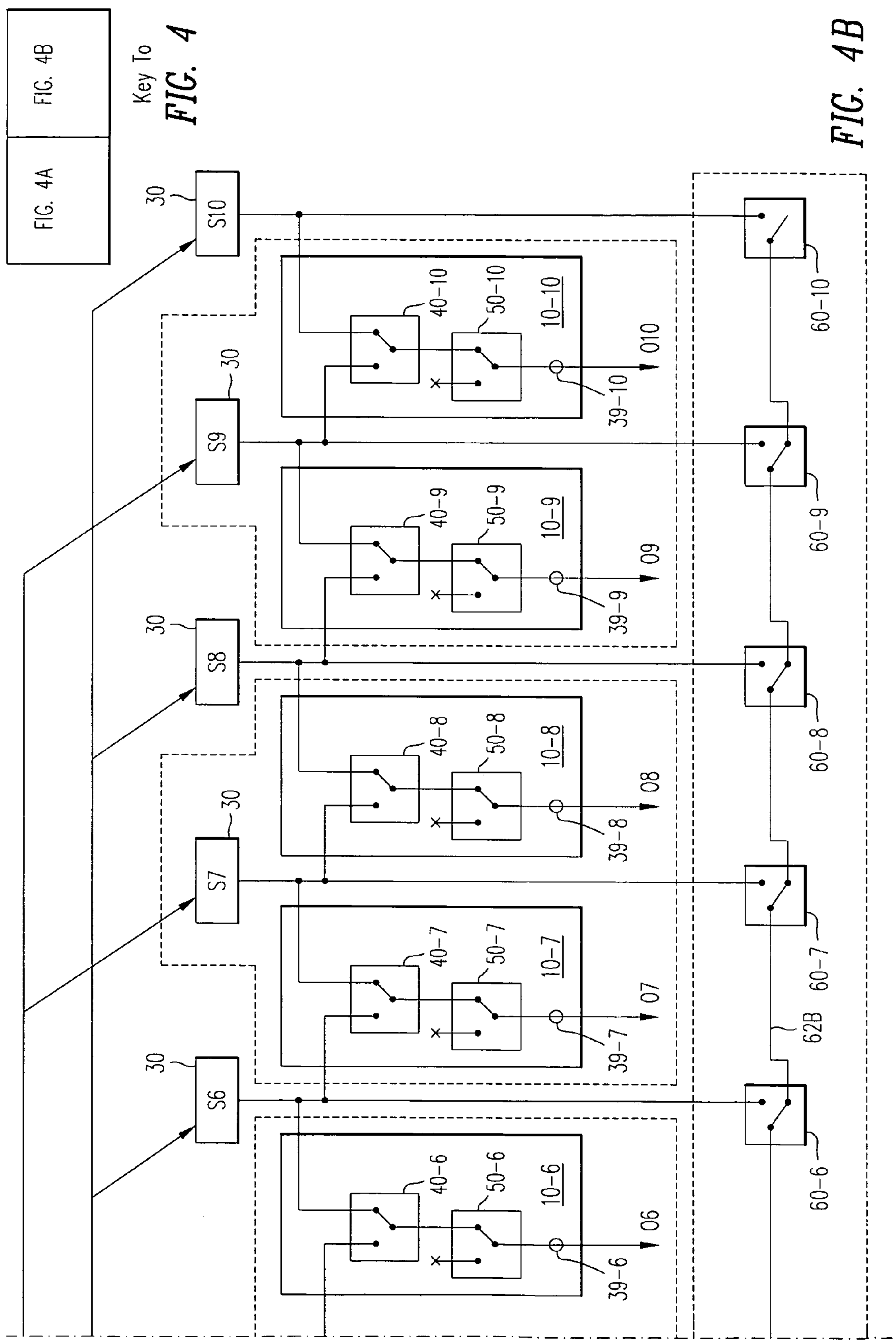

FIG. 4 shows the same ten LUs 10-*i* illustrated in FIG. 3 after being provisioned into five, 1:1 protection groups (each group surrounded by a dashed-line border) of two LUs each. The protected traffic streams Si are indicated by a common reference number 72, and the unprotected traffic streams Sj by another common reference number 74. During normal operation, there is no difference in the settings of the switches illustrated in FIGS. 3 and 4. The only difference in forming the 1:1 protection groups of FIG. 4 is that certain memory used by the above-described microprocessors 69 and 70 (see FIGS. 1A, 1B, 2A, 2B) is appropriately programmed to operate the appropriate first and second switches 40-*i*, 50-*i* in case of a failure of a protected line unit LU.

In the particular 1:1 example illustrated in FIG. 4, LU-3 has failed. In response to an external control signal triggered thereby, the traffic stream S4 to LU 10-4, the protect LU in LU 10-3's 1:1 protection group, has been dropped, and in addition, the traffic stream S3 to the failed LU 10-3 has been switched over to the protect LU 10-4's traffic stream processing circuitry 39-4, in the manner discussed above in connection with the first exemplary embodiment of 1:1 protection switching illustrated in FIGS. 1A and 1B. It may be noted that the third protection switches 60-*i* and 64 and the bypass bus parts 62A and 62B are inactive during the protection event, and indeed, are redundant in this 1:1 protection switching embodiment. This highlights an additional advantage in locating the third protection switches 60-*i* in separate, plug-in MSPA assemblies 26A, 26B, viz., that such MSPAs can be omitted from the chassis of those customers who do not wish to immediately implement any N:1 protection scheme at a savings in cost, and the modules can be added later as a relatively low-cost, "plug-and-play" add-on option, should the customer then desire to implement an N:1 equipment protection scheme.

In FIG. 5, the same ten LUs 10-1 through 10-10 are shown provisioned into two, 4:1 protect groups, each surrounded by a dashed-line border. As above, the protected traffic inputs Si are indicated by common reference number 72 and the protect traffic inputs Sj are indicated by the common reference number 74. In the example illustrated in FIG. 5, one LU in each protect group, viz., LU 10-3 in the left-hand protect group and LU 10-7 in the right-hand group, have failed, and their respective traffic streams S3, O3 and S7, O7 have accordingly been switched to the two respective protect LUs in the two protect groups, LU 10-1 and LU 10-6 by actuation of: (i) first protection switches 40-1 and 40-6 in LU 10-1 and LU 10-6, respectively; (ii) second protection switches 50-3 and 50-7 in failed, protected LUs 10-3 and 10-7, respectively; and, (iii) third protection switches 60-3 and 60-7 on the left- and right-side bypass bus parts 62A and 62B, respectively, in a manner similar to that described above in connection with the exemplary N:1 embodiment illustrated in FIGS. 2A and 2B.

The memory of the above-described microprocessors 69 and 70 is appropriately programmed to actuate the appropriate first, second, and third protection switches 40-*i*, 50-*i*, and 60-*i* as described above. Moreover, it should be noted in FIG. 5 that, to provision the two above-described 4:1 protection switching groups, the output port of the third protection switch 64 has been switched from its "main" position 64A in connection with the left-hand part 62A of the bypass bus, to its "protect" position in connection with the "protect" input port 40-6B of the first switch 40-6 in the protect LU 10-6, so that each of the two 4:1 protection groups has a respective one of the left-hand and right-hand bypass bus parts 62A and 62B dedicated exclusively to it.

FIG. 6 illustrates the same ten LUs 10-1 through 10-10 provisioned into a single, 9:1 protect group (shown surrounded by a dashed-line border around the line units). In this embodiment, each of the respective traffic streams 72 on nine protected LUs is protected, and the traffic stream 74 on one protect LU, viz., LU 10-1, is unprotected. Again, the microprocessor 69 and 70 memory is appropriately programmed to actuate the appropriate first, second, and third protection switches 40-*i*, 50-*i*, and 60-*i*, in the following manner. In the example shown in FIG. 6, LU 10-6 has failed, and the single protect LU 10-1 has dropped its own traffic stream S1 and assumed the processing of the traffic stream S6 of the failed LU 10-6 by actuation of: (i) first protection switch 40-1 in the protect LU 10-1; (ii) second protection switch 50-6 in the protected, failed LU 10-6, and (iii) third protection switch 60-6 on the bypass bus 62.

It may be noted in the 9:1 embodiment of FIG. 6 that the output port of the third protection switch 64 remains in its "main" output position, i.e., connecting the right-hand part 62B of the bypass bus 62 to the input port of the third protection switch 60-5, while the latter switch has been switched from its "main" position to its "protect" position, thereby disconnecting the LU 10-5 traffic stream S5 from the left-hand part 62A of the bypass bus, and connecting the right-hand part 62B of the bypass bus, and hence, the traffic stream S6 to the failed LU 10-6, to the left-hand part 62A of the bypass bus 62.

FIG. 7A is a table summarizing some of the possible N:1 equipment protection switching configurations possible in a chassis containing twenty LUs 10-*i*, as illustrated in FIG. 3. In particular, the three rows of the table show that the twenty LUs 10-*i* can be provisioned into ten (1:1) protection groups; four (1:4) protection groups; or, two (9:1) protection groups, as described above. Other protection configurations are possible in this chassis population, e.g., five (3:1) protection groups, depending on the user's needs and preferences. In other chassis having other line units, other configurations may be used, as will be apparent to those of skill in the art in view of the descriptions herein.

Figure 8:
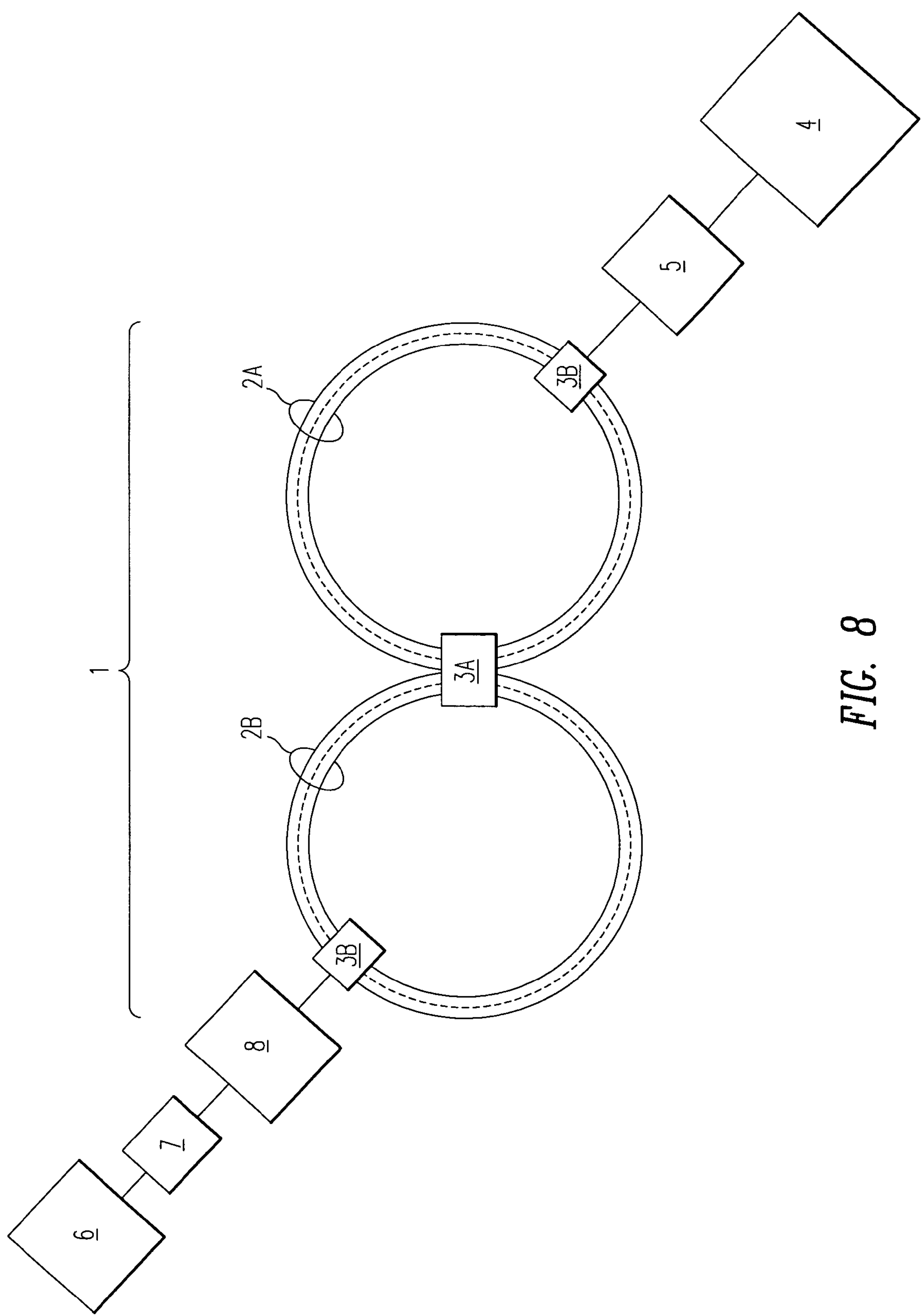
FIG. 8 schematically illustrates an access and transport system incorporating three chassis connected together in a unidirectional-path-switched-ring ("UPSR") arrangement and interconnecting the users in a local area network ("LAN") to an internet service provider ("ISP")

A hybrid TDM/ATM access and transport system 1 in one embodiment of the present invention is illustrated in FIG. 8, and includes chassis 3A, 3B, of the type described above, connected together with fiber-optic links in a unidirectional path-switched-ring ("UPSR") arrangement having two rings 2A and 2B. A system that includes at least two of such chassis can be deployed in a wide variety of configurations. Additionally, each of the chassis 3A and 3B can include two or more of such chassis connected together at a single location. The chassis 3A might reside, e.g., at a telephone company central office ("CO") location, and the two chassis 3B might reside at remote terminal locations.

In the embodiment illustrated in FIG. 8, the system 1 provides the users in a local area network ("LAN") 4, which is connected to the system through a first router 5, access to an internet service provider ("ISP") 6, which is connected to the system through a second router 7 or an ATM switch 8. The users "access," i.e., send and receive, voice, video and/or data to and from the system 1 through a "user-to-network interface" ("UNI") that includes the LUs 10-*i* described above, which are located in the chassis 3A and/or 3B.

A front side isometric view of an exemplary chassis 3B of the type described above is illustrated in FIG. 9. The chassis 3B includes a number (e.g., twenty) LUs 10-*i* that plug into a vertical mid-plane 12 (see FIG. 10) located at the rear of an equipment bay in the housing 14 of the chassis. When assembled, the equipment bay also holds the two plug-in "routing and arbitration processor" ("RAP") units 16A and 16B (see FIG. 9) discussed previously that are involved with the "gathering" and "scattering" of user voice and/or data to and from the chassis, as well as the LU failure detection and external protection switching functions described above.

The exemplary chassis 3B further includes two horizontal fan-and-protection-board modules 20A and 20B that plug into an extension of the mid-plane 12 at the rear of an elongated horizontal equipment bay 22 in the chassis housing 14. Each module 20A and 20B includes a frame 24 that supports one or more thermostatically controlled "muffin" fans (omitted for clarity). During operation, the fans take in cooling air at the bottom of the chassis 14, blow it vertically across the LUs 10-*i* and the RAPs 16A and 16B and exhaust it from the top of the chassis.

Each of the modules 20A and 20B also includes two printed circuit board MSPAs 26A and 26B, each of which mounts a plurality of the third protection switches 60*i* and 64 described above. The MSPAs 26A and 26B, along with their protection switches 60-*i* and 64, thus form a part of one possible flexible, cost-effective embodiment of the novel equipment protection switching method and apparatus that is the subject of this invention.

Figure 10:
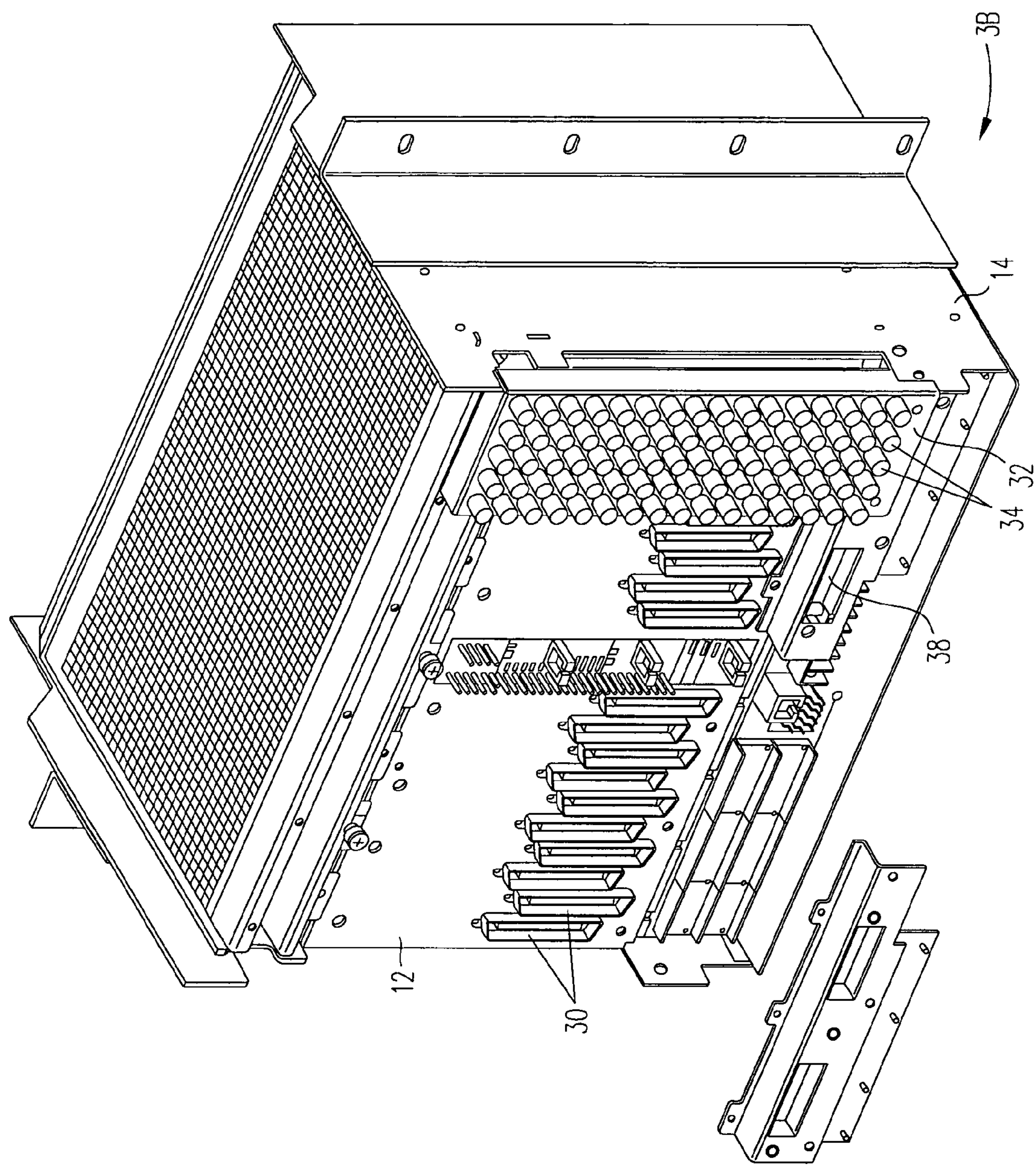

An isometric view of the rear side of the chassis 3B is illustrated in FIG. 10. In one embodiment, user access to the chassis 3B is at the rear of the chassis housing 14 via twenty, 50-pin RJ-21 Telco connectors 30, each carrying, e.g., 25 "tip/ring" wire pairs connected directly to the mid-plane 12. Alternatively, network and/or subscriber line interface may be via fiber-optic cable through twenty MPX12/24 fiber-optic connectors on the mid-plane 12. In yet another possible embodiment, user access may be via a DS-3 coaxial interface, which is accommodated by one or more chassis-mounted coaxial adapters, or "patch panels" 32, each having a plurality of BNC coaxial connectors 34 that transition internally into a single "Category 5" interface connector 36 (FIG. 9) that, in turn, mates with a complementary Category 5 connector 38 (FIG. 10) on the mid-plane 12.

Those of skill in the art will recognize that many variations, substitutions, and modifications can be made in the method and apparatus of the present invention without departing from its true scope and spirit. For example, some of the exemplary embodiments described and illustrated herein have presented in the context of an exemplary SONET optical transport system and signals.

However, the present invention is not limited to such systems or types of signals, but rather, is capable of providing line protection in a wide variety of systems and signal types, including but not limited to, the following standardized signal types: Digital Signal, level-1, North American ("DS-1"); European Standard counterpart of DS-1 ("E1"); Japanese Standard counterpart of DS-1 ("J1"); U.S. standard digital Trunk Level 1 ("T1"); North American Digital Signal, level-3 ("DS-3"); Synchronous Transport Signal, level-1 ("STS-1" or "EC-1"); Plain Old Telephone Service ("POTS"); Asymmetric Digital Subscriber Line ("ADSL"); Symmetrical Digital Subscriber Line ("SDSL"); High Speed Digital Subscriber Line ("HDSL"); High Speed Digital Subscriber Line—Specification 2 ("HDSL2"); and Symmetrical High Speed Digital Subscriber Line ("SHDSL") signals.

Moreover, a set of protected units and a method of unit protection as described herein can be used in systems other than a telecommunication system of the type illustrated in FIG. 8, depending on the embodiment. For example, such apparatus and/or method can be used in a multiprocessor system used for on-line transaction processing ("OLTP"), if the line units are replaced by appropriate "mother boards." Alternatively, such a set of protected units and a method of unit protection can also be used to build robust routers and/or web servers for use in the Internet.

Accordingly, the scope of the present invention should not be limited to that of the particular embodiments described and illustrated herein, as these are merely exemplary in nature. Rather, numerous such modifications and adaptations of the embodiments described herein are encompassed by the claims appended hereafter.

What is claimed is:

1. An apparatus for providing equipment protection in a system for processing streams of voice and/or data traffic, the apparatus comprising:

a pair of switches through which a main traffic stream passes during normal operation, the pair of switches comprising a first switch and a second switch, the first switch comprising an input port switchable between at least a main position in receipt of the main traffic stream, and a protect position in receipt of a protect traffic stream, the first switch further comprising an output port to switchably supply one of the traffic streams received at the input port depending on position, and the second switch comprising an input port switchable between at least a main position coupled to the output port of the first switch, and a protect position disconnected from the output port of the first switch;

an additional pair of switches comprising an additional first switch and an additional second switch;

wherein traffic processing circuitry in a protected line unit is coupled to an output port of the second switch in the pair of switches;

wherein traffic processing circuitry in a protect line unit is coupled to an output port of the additional second switch in the additional pair of switches;

wherein the protect traffic stream received in the protect position of the input port of the first switch is also received in the main position of the input port of the additional first switch;

wherein one of each of the first and second switches is located in a respective one of the protected and the protect line units; and wherein at least one third switch has an output port connected to the protect input port of the first switch in the protect line unit, and an input port that is switchable between a main position disconnected from the traffic stream to the protected line unit and a protect position in connection with the traffic stream to the protected line unit.

2. Apparatus for providing equipment protection in a system having at least two line units, each unit having a processor for processing streams of voice and/or data traffic, the apparatus comprising:

at least two first switches, a first one of the first switches having an output port and an input port that is switchable between a main position in connection with the traffic stream to a protected one of the line units and a protect position connectable with the traffic stream to another line unit, the second one of the first switches having an output port and an input port that is switchable between a main position in connection with the traffic stream to a protect one of the line units and a protect position in connection with the traffic stream to the protected line unit; and, at least two second switches, each of the second switches having an output port connected to the traffic processor of a respective one of the protected and the protect line units, and an input port that is switchable between a main position in connection with the output port of a respective one of the first switches and a protect position disconnected therefrom;

wherein one of each of the first and second switches is located in a respective one of the protected and the protect line units;

at least one third switch having an output port connected to the protect input port of the first switch in the protect line unit, and an input port that is switchable between a main position disconnected from the traffic stream to the protected line unit and a protect position in connection with the traffic stream to the protected line unit;

wherein the third switch and one of each of the first and second switches are located in the protected line unit, and wherein one of each of the first and second switches is located in the protect line unit.

3. The apparatus of claim 1, wherein one of each of the first and second switches is located in a respective one of the protected and the protect line units, and wherein the third switch is located separate from the protected and the protect line units.

4. Apparatus for providing equipment protection in a system having at least two line units, each unit having a processor for processing streams of voice and/or data traffic, the apparatus comprising:

at least two first switches, a first one of the first switches having an output port and an input port that is switchable between a main position in connection with the traffic stream to a protected one of the line units and a protect position connectable with the traffic stream to another line unit, the second one of the first switches having an output port and an input port that is switchable between a main position in connection with the traffic stream to a protect one of the line units and a protect position in connection with the traffic stream to the protected line unit; and, at least two second switches, each of the second switches having an output port connected to the traffic processor of a respective one of the protected and the protect line units, and an input port that is switchable between a main position in connection with the output port of a respective one of the first switches and a protect position disconnected therefrom;

wherein one of each of the first and second switches is located in a respective one of the protected and the protect line units;

at least one third switch having an output port connected to the protect input port of the first switch in the protect line unit, and an input port that is switchable between a main position disconnected from the traffic stream to the protected line unit and a protect position in connection with the traffic stream to the protected line unit;

a second one of the third switches having an output port connectable to a protect input port of a first switch associated with a third line unit and an input port that is switchable between a main position disconnected from the traffic stream to the protect line unit and a protect position in connection with the traffic stream to the protect line unit.

5. The apparatus of claim 4, wherein the second one of the third switches is located in the protect line unit.

6. The apparatus of claim 4, wherein at least one of the switches comprises a single-pole, double-throw switch.

7. The apparatus of claim 4, wherein at least one of the switches comprises a normally closed electromagnetic relay.

8. The apparatus of claim 4, wherein at least one of the switches comprises a bi-stable multi-vibrator.

9. Apparatus for providing N:1 equipment protection switching in a system having a plurality of line units, the apparatus comprising:

a set of first switches, each first switch being located in a respective one of the line units and having an output port and an input port that is switchable only between a main position in connection with a stream of traffic to the respective one of the line units and a protect position in connection with a stream of traffic to another one of the line units;

a set of second switches, each second switch being located in a respective one of the line units and having an output port connected to a traffic stream processor in the respective one of the line units and an input port that is switchable only between a main position in connection with the output port of the first switch in the respective one of the line units and a protect position disconnected from the output port of the first switch in the respective one of the line units; and a set of third switches, each third switch being associated with one of N protected ones of the line units and having an output port connected to the protect input port of the first switch located in a protect one of the line units and an input port that is switchable only between a main position disconnected from the traffic stream to the associated one of the line units and a protect position in connection therewith.

10. The apparatus of claim 9, wherein the third switches are located separate from the line units.

11. The apparatus of claim 10, wherein the third switches are located on a separate printed circuit board.

12. The apparatus of claim 9, wherein each of at least the third switches is controlled by a programmable digital microprocessor.

13. Apparatus for providing N:1 equipment protection switching in a system having a plurality of line units, the apparatus comprising:

a set of first switches, each first switch being located in a respective one of the line units and having an output port and an input port that is switchable between a main position in connection with a stream of traffic to the respective one of the line units and a protect position in connection with a stream of traffic to another one of the line units;

a set of second switches, each second switch being located in a respective one of the line units and having an output port connected to a traffic stream processor in the respective one of the line units and an input port that is switchable between a main position in connection with the output port of the first switch in the respective one of the line units and a protect position disconnected from the output port of the first switch in the respective one of the line units; and, a set of third switches, each third switch being associated with one of N protected ones of the line units and having an output port connected to the protect input port of the first switch located in a protect one of the line units and an input port that is switchable between a main position disconnected from the traffic stream to the associated one of the line units and a protect position in connection therewith;

wherein each of at least the third switches is controlled by a programmable digital microprocessor; and wherein each of the switches is connected to the microprocessor by a serial bus.

14. A method of providing equipment protection for a system having a plurality of line units for processing streams of voice and/or data traffic into and out of the line units, the method comprising:

provisioning the line units into protection groups, each protection group having at least one protected line unit and one associated protect line unit;

detecting a failure in a protected line unit; dropping the traffic stream to the associated protect line unit;

disconnecting the traffic stream to the failed line unit; and, switching the traffic stream to the failed line unit over to the associated protect line unit for continued processing thereof;

wherein dropping the traffic stream to the protect line unit and switching the traffic stream to the failed line unit over to the protect line unit comprises actuating a first switch having an input port that is switchable between a main position in connection with the traffic stream to the protect line unit and a protect position in connection with the traffic stream to the failed line unit;

wherein disconnecting the traffic stream to failed line unit comprises actuating a second switch having an input port that is switchable between a main position in connection with the traffic stream to the failed line unit and a protect position disconnected therefrom;

wherein switching the traffic stream to the failed line unit over to the protect line unit comprises actuating a third switch having ah output port connected via a bypass bus to the protect input port of the first switch and an input port that is switchable between a main position disconnected from the traffic stream to the failed line unit and a protect position in connection therewith.

15. The method of claim 14, wherein switching the traffic stream to the failed line unit over to the protect line unit comprises actuating a fourth switch having an input port connected via the bypass bus to the output port of the third switch and an output port that is switchable between a main position disconnected from the protect input port of the first switch and a protect position connected via the bypass bus to the protect input port of the first switch.

16. The method of claim 14, wherein switching the traffic input to the failed line unit over to the protect line unit comprises actuating a fourth switch having an output port connected via the bypass bus to the protect input port of the first switch and an input port that is switchable between a main position in connection with the traffic stream to a second protected line unit and a protect position disconnected therefrom.

17. The apparatus of claim 1, wherein each of at least the third switches is controlled by a microprocessor.

18. The apparatus of claim 1, wherein each of the switches is connected to a microprocessor by a serial bus.

19. The apparatus of claim 1, wherein at least one of the switches comprises a normally closed electromagnetic relay.

20. The apparatus of claim 2, wherein each of at least the third switches is controlled by a microprocessor.

21. The apparatus of claim 2, wherein each of the switches is connected to a microprocessor by a serial bus.

22. The apparatus of claim 2, wherein at least one of the switches comprises a normally closed electromagnetic relay.

23. The apparatus of claim 4, wherein each of at least the third switches is controlled by a microprocessor.

24. The apparatus of claim 4, wherein each of the switches is connected to a microprocessor by a serial bus.

25. The apparatus of claim 9, wherein each of the switches is connected to a microprocessor by a serial bus.

26. The apparatus of claim 9, wherein at least one of the switches comprises a normally closed electromagnetic relay.

27. The method of claim 14, wherein at least the third switch is controlled by a microprocessor.

* * * * *